United States Patent [19]
Apter et al.

[11] Patent Number: 5,612,525
[45] Date of Patent: Mar. 18, 1997

[54] APPARATUS FOR MARKING REFILLABLE CONTAINERS, MORE ESPECIALLY PLASTIC BOTTLES

[75] Inventors: Robert Apter, Zürich; Julian Weinstock, Rudolfstetten, both of Switzerland

[73] Assignee: Elpatronic AG, Zug, Switzerland

[21] Appl. No.: 398,515

[22] Filed: Mar. 3, 1995

Related U.S. Application Data

[62] Division of Ser. No. 893,194, Jun. 2, 1992, abandoned.

[51] Int. Cl.⁶ .................................................. G06F 17/00
[52] U.S. Cl. .................. 235/375; 235/383; 235/454; 250/223 B
[58] Field of Search ...................... 235/375, 383, 235/454; 250/223 B; 209/523, 524, 538; 198/394, 379, 377, 378

[56] References Cited

U.S. PATENT DOCUMENTS

| | | | |
|---|---|---|---|
| 2,331,277 | 10/1943 | Stout | 250/223 B |
| 3,029,349 | 4/1962 | Schell | 250/223 B |
| 3,886,353 | 5/1975 | Shioya | 250/223 B |
| 3,898,433 | 8/1975 | Sallet | 235/435 |
| 3,963,918 | 6/1976 | Jensen et al. | 250/223 B |
| 4,323,755 | 4/1982 | Nierenberg | 219/121.69 |
| 4,377,741 | 3/1983 | Brekka et al. | 235/472 |
| 4,428,474 | 1/1984 | Gau et al. | 198/391 |
| 4,757,189 | 7/1988 | Daboub | 235/462 |
| 4,916,293 | 4/1990 | Cartidge et al. | 235/432 |
| 4,919,799 | 4/1990 | Menardi et al. | 209/538 |

FOREIGN PATENT DOCUMENTS

| | | |
|---|---|---|
| 0354362 | 2/1990 | European Pat. Off. . |
| 2440583 | 10/1979 | France . |
| 2943811 | 5/1980 | Germany . |
| 3032520 | 4/1982 | Germany . |
| 3626775 | 9/1987 | Germany . |
| 3623475 | 1/1988 | Germany . |
| 3914440 | 11/1989 | Germany . |
| 3829025 | 2/1990 | Germany . |
| 4027992 | 8/1991 | Germany . |

*Primary Examiner*—Donald T. Hajec
*Assistant Examiner*—Jeffrey R. Filipek
*Attorney, Agent, or Firm*—McCormick, Paulding & Huber

[57] ABSTRACT

An apparatus is disclosed for marking refillable containers, more especially plastic bottles, with code symbols for later ascertaining whether a container has to be refilled or separated. The part of the container in which is situated a manufacturer's code present from the outset is photographed at a detection station by a camera. Using code symbols applied previously as a reference marking, the place is determined at which a new code symbol of a round trip code is applied at a marking station with a laser. The number of such code symbols gives the number of fillings of the containers, and the data content of each code symbol contains a statement concerning the filling inserted in the container, the bottler etc., in each case. With the aid of this, a certain filling sequence can be adhered to, for example, prevent a plastic bottle which previously contained a cola drink being filled with mineral water, whereas the reverse sequence would be permissible.

4 Claims, 6 Drawing Sheets

APPARATUS FOR MARKING REFILLABLE CONTAINERS, MORE ESPECIALLY PLASTIC BOTTLES

BACKGROUND OF THE INVENTION

This application is a division of Ser. No. 07/893,194, filed Jun. 2, 1992, now abandoned.

The invention relates to an apparatus for marking refillable containers, more especially plastic bottles, with code symbols with the aid of which it can be determined later whether a container has to be filled again or separated or discarded.

From DE-PS 36 26 775 it is basically known for multiple trip containers to be provided with a supplementary coding during each return. No solution is shown here for the problem of arranging the coding so that it can be detected in as error-free and also space-saving a manner as possible. The latter is especially important, because the quantity of data which has to be introduced onto the container during the life of the container, as data concerning the container itself and the filling, is on the increase, and because moreover, ever smaller containers (eg. 0.3 liter PET bottles) have to be able to be marked in this way.

From EP-A 354 362 it is known for PET bottles to be provided with code symbols by means of a laser, and a special code-reading process is known from DE-OS 29 43 811.

DE-OS 30 32 520 describes an arrangement for the control of the length of use of cylindrical containers, more especially kegs. Kegs for the drinks industry require recalibration at predetermined time intervals, eg. after eight years in each case. The known arrangement makes it possible to control the time of putting cylindrical containers in operation with regard to the necessity for recalibration of the container. To this end, each container carries in a first imaginary circle a position marking, with which a first scanning head is coordinated. In a second imaginary circle, the container carries code symbols in the form of lines which state the commissioning time, and with which a second scanning head is coordinated. The container is made to rotate about its axis of symmetry, and the first scanning head switches on the second scanning head when the position marking is detected, in its turn the second head switching on a marking reader. The code symbols for the commissioning time are composed of a number of lines, on account of which the scanning head detecting them operates with a counter, and the number of lines detected represents a measure of the commissioning time of the container. Each recalibration is retained by introducing a new code symbol. Comparison of the counter result with a control value then produces a measure of whether the container being inspected has been in operation already for a length of time which makes a recalibration necessary. If the necessity for recalibration is determined, the relevant container is separated and conveyed for calibration in another device, in which the new code symbol is also introduced. This introduction of the new code symbol takes place in a manner and at a location which are not described in DE-OS 30 32 520. Moreover, the introduction of a new code symbol takes place at any interval in relation to the preceding code symbols, which is adequate in the case of the known arrangement, as the code symbols are merely counted. The code in the known marking process, which is composed of the code symbols, obviously does not have a data content extending beyond the number of recalibrations which have taken place or the years which have passed since the commissioning of the container.

From DE-OS 36 23 475 is known a process for the recognition of mainly rotationally symmetrical objects, more especially containers, which are provided with code symbols, which process serves to recognise transport containers, eg. in the drinks industry, which are provided with an individualizing marking, from which, amongst other things, the owner and the commissioning time can be seen, in order to be able to follow the path of empties. This known process relates less, however, to code assembly, but more to the removal of the problem of being able to read the coding reliably when it has no accurately predetermined position in relation to an optical sensor. In order to remove this problem, the code symbols in the known process are arranged as radially running bars with a luminance factor differing from the surroundings, the bars being disposed circularly around a centre point. The bars are scanned, and from the scanning signals a mean value is obtained. The signals are binarized using a threshold value derived from the mean value, and the binary signals are decoded. The circular ring of the code symbols is here divided into identical sectors provided in each case for one code symbol, and a certain number of sectors is provided for representing one point of a data word in each case. In this known process, it is neither intended nor possible to mark containers with new code symbols, with the aid of which it might later be ascertained whether a container has to be refilled or discarded.

In the drinks industry, refillable plastic bottles, more especially PET bottles, in which the number of refillings is limited, are being introduced more and more instead of glass bottles. Such refillable plastic bottles must therefore be discarded if the number of round trips has reached the limiting value. This, on the other hand, necessitates the plastic bottles being provided with at least one new code symbol before each round trip, and therefore with each filling, so that the number of round trips can be determined from the total number of code symbols. The process and the device which are known from the abovementioned DE-OS 30 32 520 are not suitable for this, as the containers which are to be marked with a new code symbol are merely separated in each case, in order to be marked with a new code symbol elsewhere. Moreover, in the case of plastic bottles it would be desirable to increase the data content beyond the mere number of code symbols. In the case of bottles, this causes greater difficulties than with kegs, as the latter have a considerably larger diameter and therefore more space for the code than bottles.

A code symbol is known from DE-OS 39 14 440. This describes an optically machine-readable binary code and also a process for creating it and for determining its size and density. The code is formed from a chequerwork symbol which reproduces the data in the form of black and white squares. The binary code is dynamically variable in its size, its format and in the density of its data. The matrix has a periphery in which the data are contained. The periphery is provided with a density display for displaying the density of the data in the matrix. By using the density display and a dimension display, a scanning device can calculate the size and the data density of the binary code. This known binary code is not suitable for refillable containers such as, for example, plastic bottles, because it would not be possible to accommodate on the latter either a chequerwork matrix of black and white squares or an adequate number of such binary codes which are of an adequate size, so that the squares can also be sufficiently reliably detected.

SUMMARY OF THE INVENTION

The problem of the invention is to modify a process and device of the type hereinbefore mentioned in such a way that the code symbols can be read and the refillable containers marked with a new code symbol in one operation, without firstly having to be separated, and wherein there is also intended to be a possibility of the data content of all the code symbols containing more than just their quantity. Here, the code is intended to be arranged so that it can be easily read and applied, and more especially, be space-saving. A corresponding code symbol is furthermore intended to be provided.

The problem is further solved according to the invention, with a detection station having a combined detection and reading arrangement together with an image processing arrangement and code marking device, originating from apparatus of the type hereinbefore mentioned.

The apparatus simplifies the marking of refillable containers with code symbols, as no special position marking is applied to the container, but the already existing code symbols are used in each case for this. The data content of all the code symbols is larger than in known processes, as the code symbols are not applied to the container at arbitrary intervals and in an arbitrary sequence, but in a definite relation to the previously applied code symbols in each case. This further allows a specially space-saving arrangement of the code with good readability. The apparatus requires less expenditure of time for marking, as containers which are to be marked are not separated, but are also marked with a new code symbol in the same operation after reading. The code symbols form a regulated sequential code, as the application of the code and the interpretation of the code are a function of the relative position in regard to a reference point, and if, as explained further in greater detail, a suitable code symbol is used, are a function of the relative position of the code elements or words.

The apparatus in comparison with the known apparatus, offers the same advantages, as the detection and reading device are combined together, and a marking device for marking the containers with code symbols is connected to the latter inside one and the same apparatus.

The subject matter of the subsidiary claims relate to advantageous developments of the invention.

The first code symbol is advantageously not randomly positioned, but in dependence on a code sign of the manufacturer's code.

In one development of the invention, the position for applying a new code symbol linked to the code symbol applied during the preceding refilling can be found in a specially simple and error-free manner, as the angle between this position and the first code symbol of the manufacturer's code through which the container has to be rotated about its axis of symmetry during the movement out of the detection and reading position into the marking position, is determined in each case.

The reading reliability is increased and the marking is simplified if in one development of the invention, each new code element is inscribed in a cell, i.e. in the next free cell, the inscription occurring in such a way that the code symbols do not mutually overlap.

The invention offers the special advantage that there is formed on the container not only a round trip code, but with the aid of the data content of the latest available code symbol in each case, the history or the past of the container can be followed, in regard to filling and/or bottler and/or filling date and/or other data concerning the refilling of the container. Here, the data concerning the filling which has been in the container in the past and more especially recently, is of great importance in the case of plastic bottles. Plastic such as, for example PET, does in fact absorb odour from the filling. Also, the latter cannot be removed by the washing of such bottles, because plastic bottles have to be washed at considerably lower temperatures than glass bottles, eg. at only 50° to 60° C. If a plastic bottle is provided as a multi-purpose bottle which is intended to be filled with four different drinks, eg. with mineral water, lemonade, fruit juice and a cola drink, it is advantageous to adhere to a permitted filling sequence during refilling. A permitted filling sequence would, for example, be to fill a plastic bottle which was previously filled with mineral water, with a cola drink. On the other hand, an inadmissible filling sequence would be to fill a plastic bottle which was previously filled with a cola drink, with mineral water. In the development of the invention, it is possible, by evaluating the data content of the recently existing code symbol, to separate a container if a permitted filling sequence were not to be adhered to as a result of the refilling.

Another development of the invention provides a specially simple possibility of marking plastic bottles with code symbols. The process for coding by means of a laser beam and its control by a mask or a gate or modulation by a beam-deflection system are the subject-matter of German Patent 38 29 025 of the applicant, to which reference is made concerning further details.

A further development of the invention guarantees good process results, as a reliable camera technique and also image-processing hardware and software are available. As an example, reference may be made to an older proposal of the applicant which constitutes the subject matter of German Patent 40 27 992, to which reference is made concerning further details in like manner.

An apparatus employing a variable matrix is especially suitable for being able to trace the past or history of a container. The size of the matrix elements within the code symbol can be selected in dependence upon and according to code data content and configuration, position of the code symbol and/or reading process and/or according to other details, as long as the size of the individual matrix elements is always sufficient to ensure a reliable perceptibility when the usual pattern recognition technique is used.

In further development, the apparatus is especially efficient, as the carousel device makes possible a high throughput with accurate positioning of the containers in the detection and reading station and also in the marking station, and the use of only one camera, or only one marking device, in these stations. The carousel device makes short manufacturing times possible, because the containers during the time in which they are moved out of the detection and reading station into the marking station are moved about their own axis of symmetry into the position in which they have to be marked with the new code symbol. The movement out of the one into the other station is no lost time, as after the detection of the relative position of the manufacturer's code and the round trip code, the container has to be rotated in any case into the position which is suitable for marking with the new code symbol, and this rotation now occurs during the movement between these two stations. The marking process itself likewise proceeds very rapidly, because always only a single code symbol is put on the container per refilling.

In the development another rotation device makes it possible to position the containers in the two aforementioned stations in a manner which is accurate and gives little vibration.

In the development of a further invention the code symbols and the manufacturer's code are in the areas of the container which are less subject to mechanical damage during handling, such as, for example, the curved wall area of a plastic bottle immediately above the base. Instead of this area, an area on the neck of a plastic bottle can also be used, but the available space here is considerably smaller on account of the smaller diameter.

BRIEF DESCRIPTION OF THE DRAWINGS

Exemplified embodiments of the invention are described hereafter with reference to the drawings, in greater detail.

DESCRIPTION OF THE PREFERRED EMBODIMENTS

The following description actually relates to the marking of refillable cylindrical containers in the form of PET bottles (hereinafter referred to in brief as bottles), but other transparent or non-transparent cylindrical containers, eg. glass bottles or tin cans, can also be marked with the device.

Figure 1:
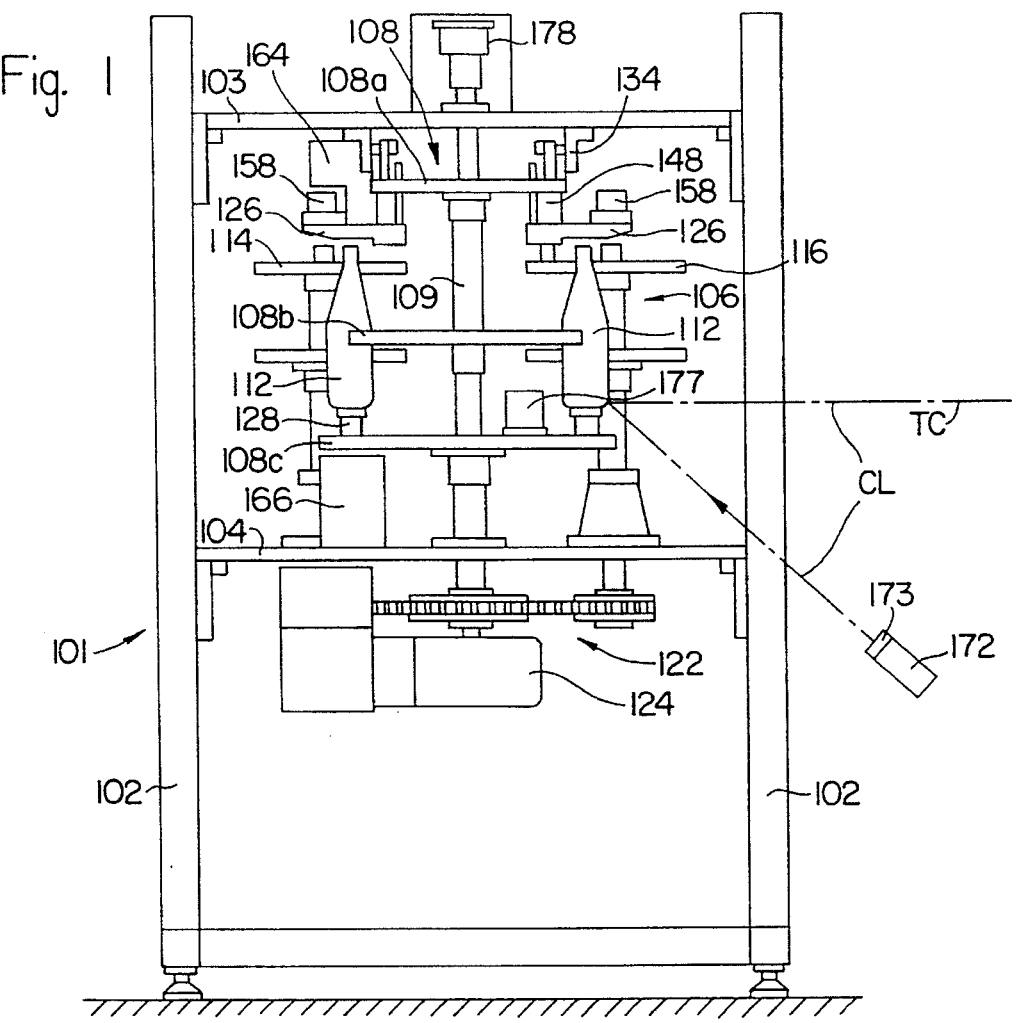
FIG. 1 shows apparatus according to the invention for marking refillable plastic bottles.
Figure 2:
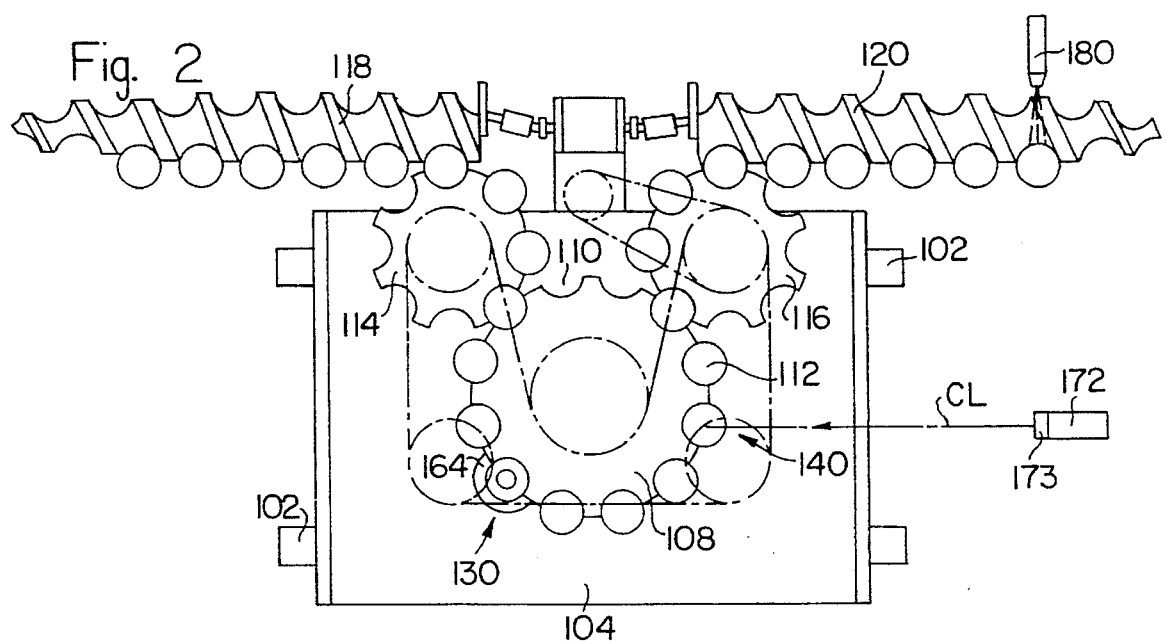
FIG. 2 shows the apparatus according to FIG. 1 in a simplified top plan view.
Figure 3:
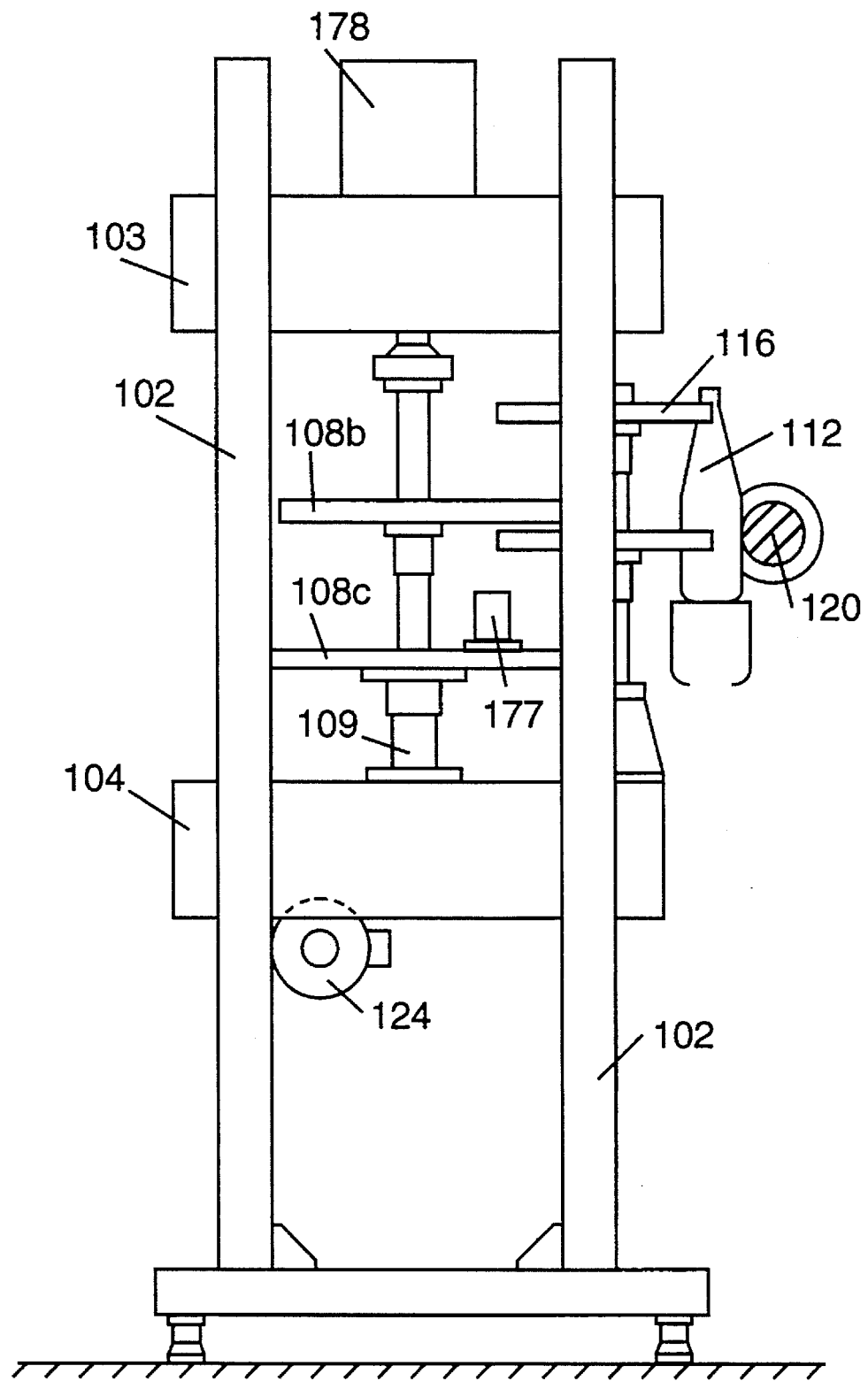
FIG. 3 shows the apparatus according to FIG. 1 in side view.

The apparatus is indicated in general by 101 in FIGS. 1 to 3. The apparatus 101 has a frame 102 with an upper support plate 103 and a lower support plate 104, between which is fastened a carousel arrangement indicated generally with 106. The carousel arrangement 106 has a central carousel 108 with twelve receiver arrangements 110 for bottles 112 and also two smaller carousels 114 and 116, each with eight receiver arrangements. The carousel arrangement 106 is part of a conveyor arrangement, with which the bottles 112 are moved into a detection station 130 and a marking station 140, which is described in greater detail further on. The two smaller carousels 114 and 116, in conjunction with two screw conveyors 118 and 120, convey the bottles 112 into or out of the apparatus 101. Below the lower support plate 104 is fastened a common drive system 122, which comprises a geared motor 124 which drives the carousel arrangement 106 and the screw conveyors 118 and 120 via toothed pulleys and toothed belts which are not indicated in greater detail.

Figure 4:
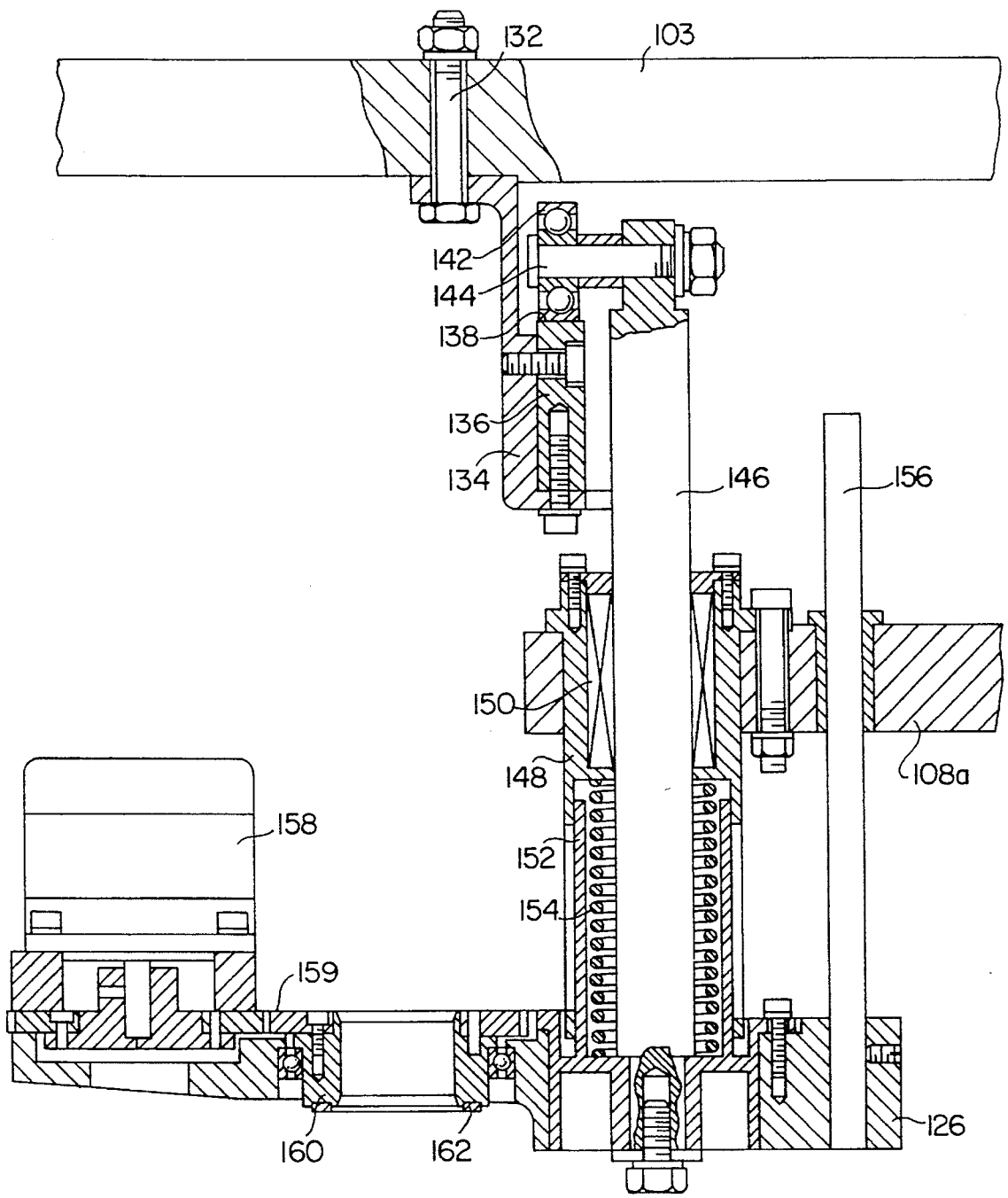
FIG. 4 shows as a detail a head of a rotation arrangement of the apparatus according to FIG. 1.

The central carousel 108 is composed of an upper main carousel 108a, a central main carousel 108b and a lower main carousel 108c, which are fastened to a common shaft 109. The receiver arrangements 110 are composed of twelve cavities, semicircular in cross-section, on the central main carousel 108b, twelve heads provided on the upper carousel 108a (only two are visible in FIG. 1) and twelve rotatable seats 128, mounted on the lower main carousel 108c, for receiving, clamping or mounting the bottles 112. One of the heads 126 is illustrated in FIG. 4 as a detail to which reference is now made together with FIG. 1.

Each head 126 is fastened so as to be vertically movable on the upper main carousel 108a. A support ring 134 is fastened to the upper support plate 103 by means of screws 132. The support ring 134 carries an annular cam body 136, on the cam track 138 of which runs a follower roller 142, which is illustrated here as a ball bearing. The follower roller is fastened to the top end of a support rod 146 by means of a bolt 144. The head 126 is fastened to the bottom end of the support rod 146. A linear bearing 150 is arranged in a bearing housing 148 which is fastened to the upper main carousel 108a. Between the bearing housing 148 and the head 126 there is arranged in a spring housing 152 a spring 154, which preloads the head 126 in a downward direction. The head 126 can at any time be moved downwards by the spring as permitted by the height of a bottle 112 or the cam track 138. A pin 156, which is displaceably guided in the upper main carousel 108a, prevents the head 126 in the linear bearing 150 being able to rotate about the longitudinal axis of the support rod 146. At the outer end of the head 126 is fastened a stepping motor 158, which via toothed wheel reduction gear 159, rotates a sleeve 160 which can be lowered with the head 126 onto the bottle mouth. The sleeve 160 thereupon engages the bottle mouth with a friction ring 162. The course or the shape of the cam track 138 is so selected, that the head 126 is arranged in the area of the carousel 114 at a spacing above the bottle mouth, then during the movement of the bottle 112 into the detection station 130, is lowered onto the bottle mouth and remains lowered at least until the marking station 140 is reached, and is finally raised again from the bottle and moved back to its original height, in which it is at a spacing from the bottle mouth. The control of the stepping motor 158, by means of which the bottle 112 can be rotated about its axis of symmetry, ie. its vertical longitudinal axis, is described below.

The motor 158 of each head 126 is not arranged on the axis of the bottle, ie. not on the central axis of the sleeve 160, but at a spacing therefrom, in order not to obstruct the line of sight for a detection device which is also described in greater detail below. This detection device comprises a camera 164 and an illumination source 166. According to FIG. 1, the camera 164 is fastened to the underside of the upper support plate 103 beside the upper main carousel 108 and above the path of the heads 126. The illumination source 166 is fastened to the bottom support plate 104 below the lower main carousel 108c in line with the camera 164. The bottles are moved by the central carousel 108 on a circular path, and in the detection station 130 each bottle passes through a position in which its axis of symmetry coincides with the line connecting the illumination source 166 and the camera 164. This position is illustrated on the left in FIG. 1 and also in FIG. 6. The lighting source 166 is a stroboscope, which generates a flash of light each time a bottle 112 is exactly between lighting source and camera.

Figure 5:
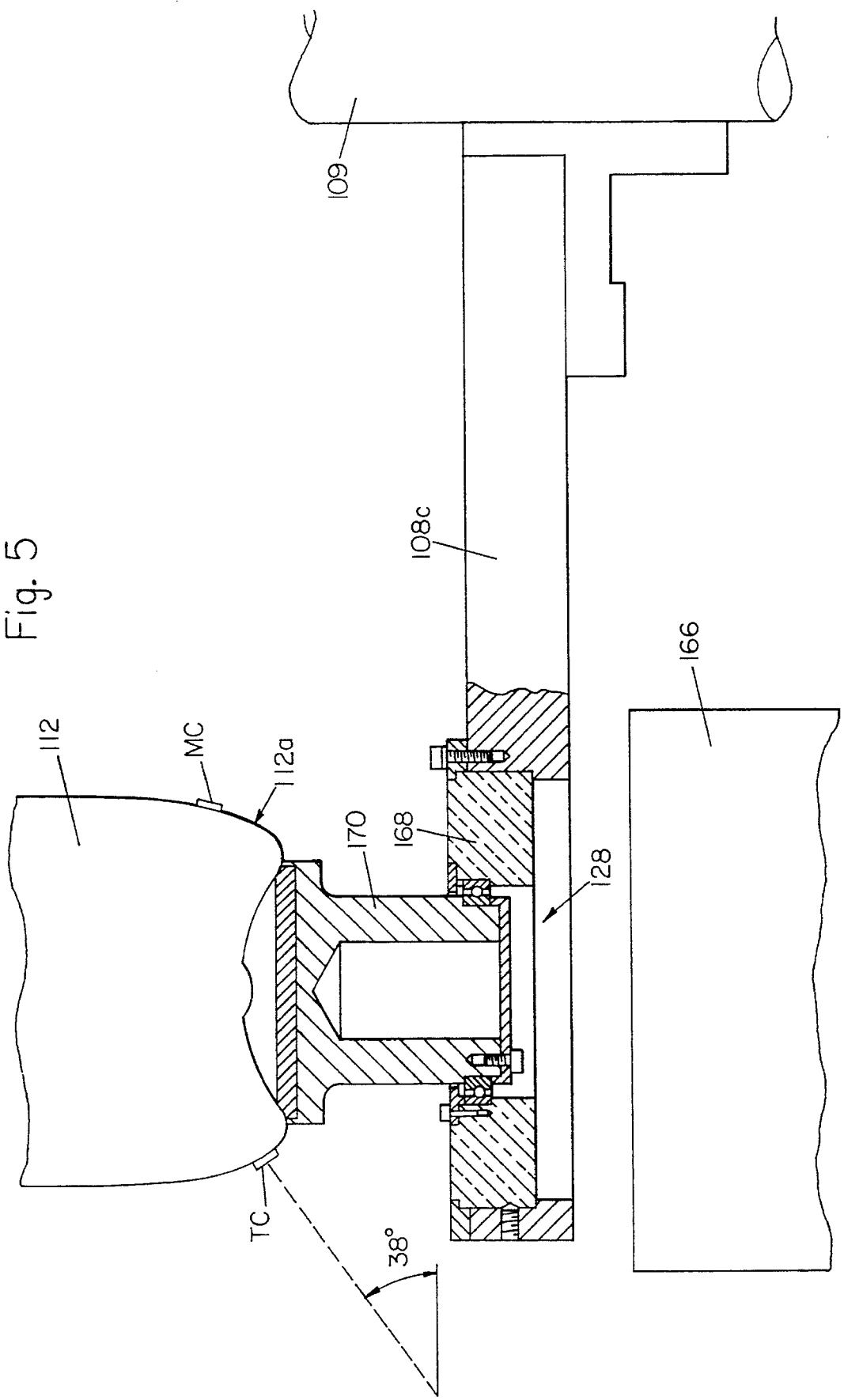
FIG. 5 shows as a detail a rotatable seat of the apparatus according to FIG. 1 with a plastic bottle which is arranged on the seat and is only partly illustrated.

In FIG. 5 are shown the lower main carousel 108c and the rotatable seat 128 as the bottom part of one of the twelve receiver arrangements 110 of the central carousel 108. The rotatable seat 128 comprises a circular part 168 of transparent material (eg. acrylic glass), which is fastened in a circular opening of the lower main carousel 108c, and of a platform 170 for the bottle 112, which is rotatably fastened in the annular part 168 in the manner illustrated in FIG. 5. The lighting source 166 sends light upwards through the transparent annular part 168 and illuminates the bottom curved part 112a of the bottle. In this area the bottle 112 carries a manufacturer's code MC which is present from the beginning, and a round trip code TC, which is already applied or has still to be applied. The manufacturer's code MC is composed of several code marks, and the round trip code TC is composed of at least one code symbol, all of which is described in greater detail hereafter. The camera 164 takes a picture of the lower area 112a of the bottle 112 from the inside of the bottle when the latter is illuminated by the lighting source 166. As an instantaneous exposure is involved, the carousel arrangement 106 does not need to be arrested in the detection station 130. On its way to the detection station 130, the bottle is clamped by the head 126, which is moved vertically downwards onto the bottle mouth and which presses against the bottle mouth (in the case of PET bottles, the ring around the outside of the bottle mouth) and at the same time presses the bottle against the freely rotatable platform 170. As soon as the camera 164 has taken a picture of the lower area 112a, the stepping motor 158 causes the bottle 112 to rotate so that when it reaches the marking station 140, it has been rotated about its axis of symmetry into a position in which it can be marked with a new code symbol of the round trip code TC by a marking device 172 provided in the marking station, in the manner described in detail hereafter. The marking device 172 in the exemplified embodiment illustrated is a laser which sends the laser beam obliquely from below at an angle of about 38° to the horizontal (centre line CL of the round trip code TC) onto the outer surface of the bottle 112. The laser beam can be sent through a device 173, in order to give the code symbol a certain configuration. The device 173 can be a mask, a gate or the like, or a beam-deflecting system which modulates the laser beam.

Figure 6:
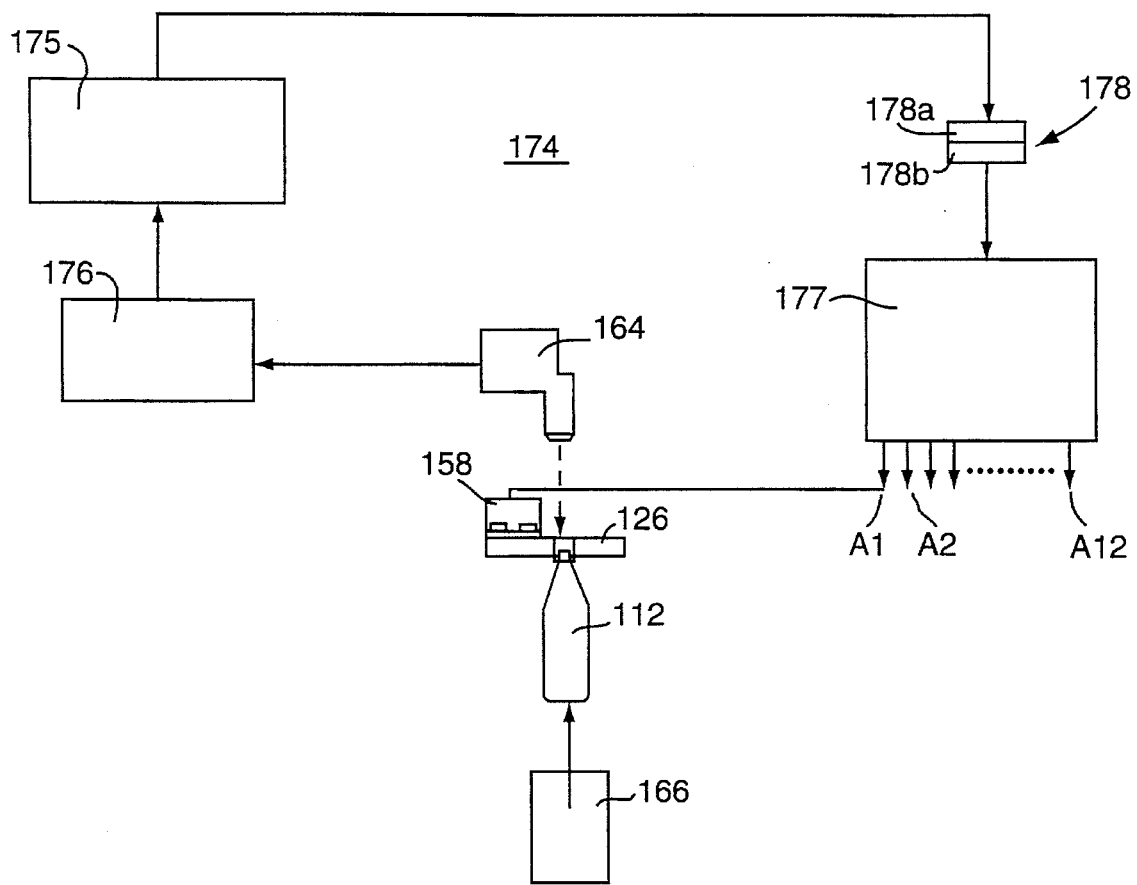
FIG. 6 shows a logic diagram for the apparatus according to FIG. 1.

FIG. 6 shows a diagram of a logic apparatus which is marked generally with 174. This comprises a main controller 175, an image processor 176 and a carousel microcontroller 177 as a control device for the twelve stepping motors 158. The carousel microcontroller 177 has twelve outputs A1–A12 for the stepping motors 158, but only one stepping motor 158 is shown in FIG. 6. The main controller 175 is mounted beside or at a distance from the apparatus 101, whereas the carousel microcontroller 177 is fastened to the lower main carousel 108a, as indicated in FIG. 1. Its outputs A1–A12 are connected to the stepping motors 158 via unillustrated lines. The connection between the stationary image processor 176 and the carousel microcontroller 177 rotating with the central carousel 108 is obtained through a slip ring 178. The latter, as indicated diagrammatically in FIG. 6, has a stationary slip ring 178a and a slip ring 178b, which is fastened to the shaft 109 of the central carousel 108 and therefore rotates. Data are transmitted serially during the relative rotation of the slip rings.

The main controller 175 follows the bottles 112 on their way through the apparatus and thereby receives input signals from various sensors and a rotary sender (not illustrated in each case) and thus controls the entire apparatus including the actuation of the lighting source 166 and of the camera 164, which are likewise part of the image-processing hardware. The image processor 176 determines the position of the original, ie. the first code mark of the manufacturer's code MC and of the first code symbol of the round trip code TC relative to the reference system of the receiver arrangement 110 and also the number and the data content of the code symbols of the round trip code already fixed. The carousel microcontroller 177 determines, in a manner which is to be more fully described hereinafter, the position of the place where the new code symbol is to be fixed, in which connection it uses data from the image processor, and positions the bottles in such a way that the new code symbol of the round trip code can be fixed at the correct place by means of the laser 172. To this end, the carousel microcontroller 177 controls the stepping motor 158 of the head 126 which is in the detection station 130, so that the stepping motor 158 rotates the bottle accordingly, until it reaches the marking station 140.

Each bottle has to be provided with a new code symbol of the round trip code, if this is permissible for the reasons explained hereinafter in greater detail and the bottle does not have to be discarded. A rejection means 180 is merely indicated symbolically in FIG. 2. It may be a nozzle, which blows against the bottle which is to be discarded.

The apparatus for marking refillable transparent bottles operates, once again briefly summarised, in the following manner.

After the bottle 112 has passed the screw conveyor 118 and the carousel 114 at the inlet of the device, it is vertically clamped in the receiver arrangements 110 of the central carousel 108 by lowering the head 126. After clamping, some time is available to allow any vibration to die away. The bottle 112 then passes the detection station 130, in which the camera 164 (above the bottle) and the lighting source 166 (below the bottle) are provided. The camera 164 takes a picture of the lower area 112a of the bottle 112, where the codes MC and TC are situated. The image processor determines the position of the original of the codes and the number of existing code symbols of the round trip code TC (eg. in approximately 120 ms). This data is transmitted to the main controller 175 and from here to the carousel microcontroller 177. The carousel microcontroller 177 controls the stepping motors 158, in order to bring the bottle 112 into the position in which it can be marked with a new code symbol (which requires less than 240 ms, for example). Various strategies can be followed for the course of the speed of rotation over the time in dependence upon the number of rotational steps to be performed by the stepping motor 158, in order to avoid vibration, to lose no rotational steps and to carry out the movement in the time available between the detection station 130 and the marking station 140. The movement here is supervised by an unillustrated inductive proximity sensor. When the bottle 112 has been correctly positioned for applying the new code symbol, the place at which the new code symbol is to be applied is exactly on the centre line CL of the laser 172, which then acts upon this place. After applying the new code symbol the bottle is released, by raising the head 126. The carousel 116 and the screw conveyor 120 at the outlet of the apparatus 101 convey the bottle 112 out of the apparatus.

Further possibilities which are offered by the main controller 175 and the carousel microcontroller 177, such as statistics, self-testing, programming of the various types of operation etc., are not necessary for an understanding of the invention and for this reason do not need to be described in greater detail here. On the other hand, the purpose of the round trip code, whose compilation (mechanical appearance) and the principles and process for applying and reading the round trip code, which is engraved on transparent refillable bottles, are important for understanding the invention, for which reason this is described hereafter in greater detail.

It has already been explained hereinbefore, that the main purpose of the round trip code TC is to be able to trace the history or past of the bottle regarding filling and/or bottler and/or bottling date and/or number of fillings and/or other data concerning filling. The round trip code is an organised, sequential code and contains thirty or more data parts, each of which has a range of 2048 or more possible combinations, which in the manner described here, are engraved in the surface of a transparent bottle and are later read again.

Figure 7:
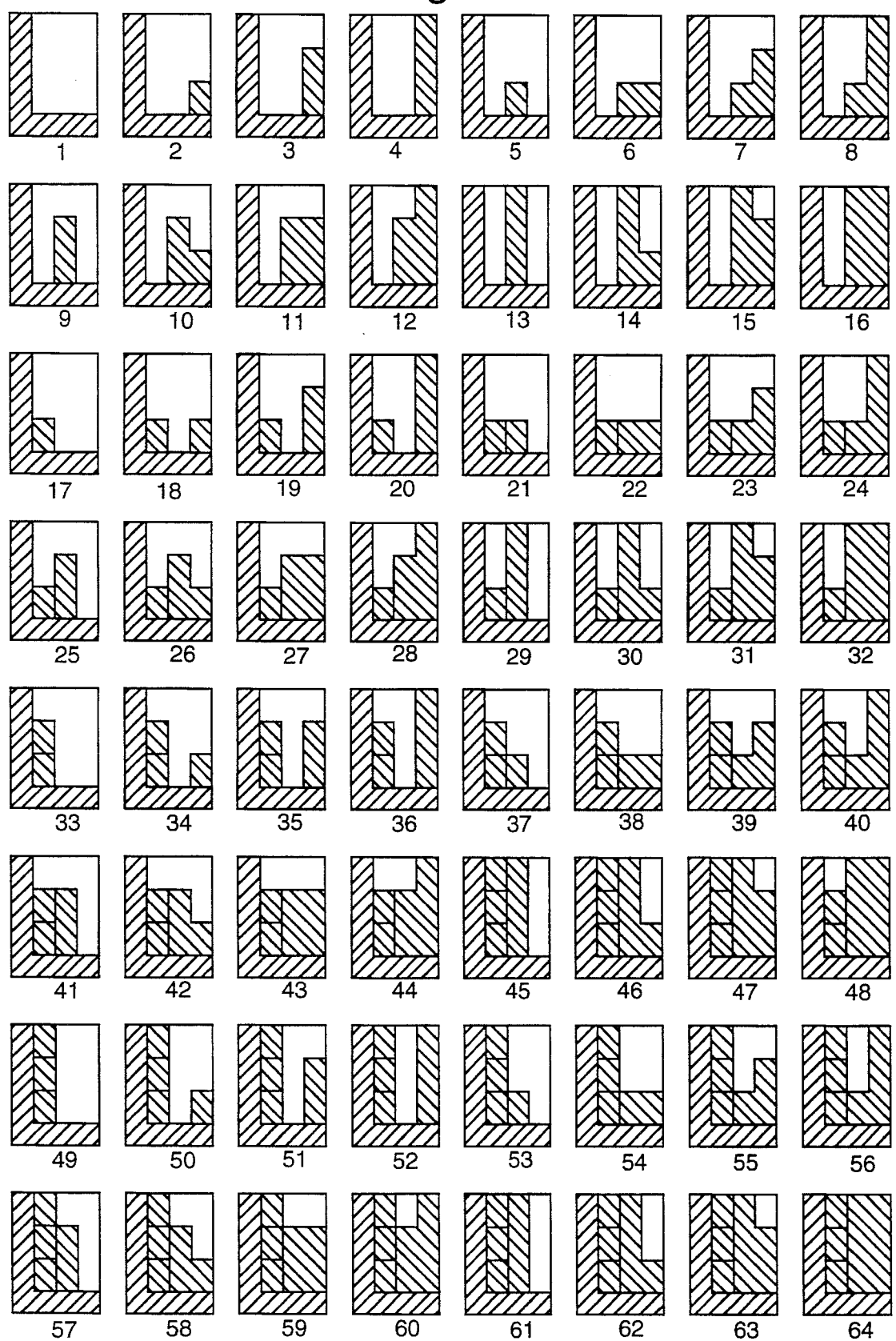
FIG. 7 shows sixty-four possibilities of development of a code symbol.

According to the illustration in FIG. 7, the round trip code TC has the following features:

1. A variable 3×3 matrix with binary rough data from $2^9=512$ different combinations.

2. A fixed 3×1 line vector, which is arranged on the top or bottom (or both) of the matrix, for class discrimination and for the registration process during reading and interpretation.

3. A fixed 3×1 column vector, which is arranged on the left or right side (or both sides) of the matrix, for class discrimination and for the registration process during reading and interpretation.

4. An error detection and/or correction mechanism for each line and/or column (eg. a CRC code, a Hamming code, odd/even parity etc). Each of the above components of the code may or may not exist in one code symbol, as shown in FIG. 7.

Each code symbol of the round trip code TC can be applied to refillable containers and more especially to refillable PET bottles at various points. Areas which are less subject to mechanical damage caused by handling and use are preferred, such as, for example, the curved area 112a (FIG. 5).

Each element of the code symbol (ie. a matrix element, a vector or a testing element) has a size within a range of 0.5 to 2.5 mm, depending upon data content/configuration of the code symbol, fixing point of the same and/or reading process and/or other factors to be considered, resulting in an overall size of each code symbol which ranges from 2 to 13 mm×2 to 13 mm, which is dependent upon the same influencing factors as in each element.

The round trip code TC is denoted as ordered and sequential, as the production and the interpretation of the code are a function of the absolute and/or relative position with regard to a reference point and a function of the relative position of the code elements (words).

The round trip code TC in the example described here is engraved in the outer surface of the bottle 112 by means of the laser 172. Reading of the round trip code TC and interpretation of the data content occur by means of the abovedescribed image-processor hardware and software using the camera 164.

The code symbol 1 in FIG. 7 contains merely the column and line vector as a registering marking (for maintaining registration during reading and interpretation of the round trip code). The usable surface of the code symbol is the rectangular-shaped 3×3 matrix, which makes possible an alphabet of 4 symbols and words of 3 symbols in each case, producing altogether $4^3=64$ possible code symbols.

By way of example, the 64 code symbols can be coordinated with 16 filling installations, each of which is able to fill the bottles with 4 different products. The coordination can occur in the following way:
Code symbol 1: Installation 1, product 1
Code symbol 2: Installation 1, product 2
Code symbol 4: Installation 1, product 4
Code symbol 6: Installation 2, product 2
Code symbol 11: Installation 3, product 3
Code symbol 16: Installation 4, product 4
Code symbol 63: Installation 16, product 3
Code symbol 64: Installation 16, product 4.

Another possibility of coordination could consist of coordinating 64 different products with 16 installations, eg. products 1 to 4 from installation 1, 5 to 8 from installation 2, 9 to 12 from installation 3, . . . and 60 to 64 from installation 16.

The round trip code TC in the example described here is fixed to the bottles 112, the manufacturer's code MC, which has already been in existence on the bottles from the outset, being referred to for the choice of the reference marking. The manufacturer's code MC is engraved in the bottle when it is manufactured (or fixed in another way) and contains data concerning the manufacture of the bottle (working shift of the bottle manufacturer, type of bottle, bottle production line, date, control bits, start and stop bit). An appropriate manufacturer's code of the applicant which is used with PET bottles is composed of 32 bits, but it is not necessary to consider this more closely here.

The round trip code TC is composed of a succession of code symbols, of which one is applied to the bottle during the first filling and further ones during each refilling, and therefore consists of at least one code symbol and of a maximum of 25 to 30 code symbols. Each code symbol contains data concerning the filling and the bottler.

Figure 8:
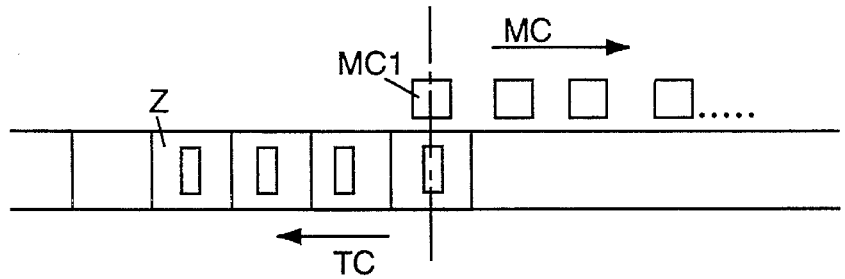
FIG. 8 shows diagrammatically the mutual association of manufacturer's code and round trip code.

The manufacturer's code MC and the round trip code TC are arranged in the basal area 112a of the bottle in closely adjacent circular rings (FIG. 5). The radius one which the centre of the first bit of the manufacturer's code is situated is regarded as the origin of the code. The circular ring, ie. the circular ring-shaped surface area in which the round trip code TC is applied, is divided into 25 cells (in the case of bottles in which 25 round trips or fillings at maximum are permitted), so that each cell occupies 360°/25=14.4°, that is to say, from the aforementioned origin (source), which is illustrated symbolically in FIG. 8. Each new code symbol is inscribed in the first free cell. The first code symbol TC is preferably placed underneath the code mark MC1, as shown in FIG. 8. The first code symbol can, however, also be placed randomly.

In order that no additive positioning errors can occur, the position where the new code symbol of the round trip code is fixed is determined with reference to the origin (and therefore here with reference to the first code symbol in FIG. 8) and not with reference to the preceding code symbol. Because the positioning accuracy is limited, the code symbols of the round trip code TC do not occupy the entire cell in each case, in order to avoid overlapping.

It is advantageous, but not absolutely necessary, to use the first code mark MC1 of the manufacturer's code as a position marking for the code symbols of the round trip code TC. For example, the second, third or any other code mark of the manufacturer's code could also be used for this purpose.

The mutual relative position of manufacturer's code and round trip code is determined and known according to choice of the position marking. When the bottle 112 passes into the central carousel 108, it has an optional position in relation to an external reference point. The image processor 176 therefore determines firstly the position of the manufacturer's code and the round trip code which already exists in some cases. Thereafter, the image-processing software can determine in a simple manner, the angle through which the bottle has to be rotated about its axis of symmetry on its way to the marking station 140, so that the correct place for the new code symbol is then situated in the centre line CL of the laser 172. The image processor here determines the position of the round trip code TC and the number of cells already occupied by code symbols of the round trip code, in order to find the first free cell in which the new code symbol has to be inscribed. If there is not yet any code symbol, the position of the first code is selected at random, but preferably in dependence upon the position of the manufacturer's code MC.

It has already been fully described hereinbefore, that a new code symbol is fixed only when a certain filling sequence is adhered to by refilling. The data necessary for this is obtained by the image processor 167 by evaluating the data content of the last code symbol of the round trip code TC in each case. This data is contained in the individual code symbols 1 to 64 in the way described above, in which each code element is composed of one, two or three matrix elements which adjoin each other vertically without gaps. Of these code elements, zero (see code symbol 1) to three per code symbol may exist (see code symbol 64) and consist of 1 to 3 matrix elements in each case, which can readily be seen from FIG. 7 and the coordination example stated above.

In the exemplified embodiment described hereinbefore with reference to the drawings, the camera 164 is provided in the detection station 130 not only for detecting the manufacturer's code MC, but also for reading the round trip code TC. If an inspection machine with a camera is already in existence in a filling plant, which operates according to the principle of the camera 164 described here (that is to say, as a video camera with CCD or similar image converter device), the manufacturer's code which exists from the outset on the bottle, is stored in the memory of the inspection machine with the image of the lower area of the bottle. This stored data can be used in the image processor 176, in order to find the absolute position of the manufacturer's code for marking with the round trip code, if this is preferred for the first code symbol. In this case, merely a photodetector needs to be provided in the detection station 130 instead of a camera. The photodetector reads the bit pattern of the manufacturer's code, which pattern is compared with the manufacturer's code bit pattern which is fed in from the memory of the inspection machine and is also known. The true position of the manufacturer's code is found when the number of non-correspondences between the stored and the read bit pattern is at the minimum. From a code mark of the manufacturer's code selected as a position marking, the photodetector also reads the code symbols of the round trip code. Reading of the data content of the code symbols takes place in the image processor by corresponding pattern-recognition technology.

We claim:

1. Apparatus for marking refillable containers, having a manufacturer's code, which defines a reference position on the container, and code symbols with the aid of which it can later be ascertained whether a container has to be refilled or separated, comprising:

a conveyor for moving the containers in a conveying direction;

a detection station positioned along the conveyor, and having a combined detection and reading arrangement with a camera for photographing manufacturer's codes and code symbols on the containers;

a processing arrangement with an image processor connected to the camera for determining the positions of the manufacturer's code and the code symbols on the containers;

a rotary device for rotating the containers about an axis of symmetry, a controller connected to the image processor and to the rotary device to rotatably position the containers for marking relative to the manufacturer's code, and a marking station positioned along the conveyor and having a marking device for marking the containers with code symbols indicative of the number of times a container has been refilled and positioned on the containers in reference to the positions of the manufacturer's code and any other code symbols previously-marked on the container, the marking station being positioned after the detection station in the conveying direction.

2. Apparatus as claimed in claim 1, wherein the conveyor further comprises:

a carousel device with several receivers for the containers, wherein each of the receivers is coordinated with the rotary device for rotating a received container about its axis of symmetry and each receiver can be moved one after the other through the detection station and the marking station.

3. Device as claimed in claim 2, wherein each rotary arrangement has a head which is movable along the axis of symmetry, and which can be lowered onto the container by means of a curved body, and carries a stepping motor which can be actuated by the control arrangement and is mounted laterally to the axis of symmetry of the container, said motor being arranged to rotate the container about the axis of symmetry, and that the carousel arrangement has an upper main carousel, on which the heads are mounted.

4. Device as claimed in claim 1, wherein the marking device has a laser and the laser is arranged to form the code symbols on the container in a circular ring around the circumference of a bottle in a predetermined position relative to the manufacturer's code.

* * * * *